(12) United States Patent
Rolston

(10) Patent No.: US 8,349,139 B2
(45) Date of Patent: Jan. 8, 2013

(54) PYROLYSIS APPARATUS AND METHODS USING SAME

(75) Inventor: Peter John Rolston, Christchurch (NZ)

(73) Assignee: All Grade Holdings Limited, Christchurch (NZ)

( * ) Notice: Subject to any disclaimer, the term of this patent is extended or adjusted under 35 U.S.C. 154(b) by 0 days.

(21) Appl. No.: 13/496,463

(22) PCT Filed: Sep. 14, 2010

(86) PCT No.: PCT/NZ2010/000184
§ 371 (c)(1),
(2), (4) Date: May 18, 2012

(87) PCT Pub. No.: WO2011/034446
PCT Pub. Date: Mar. 24, 2011

(65) Prior Publication Data
US 2012/0228113 A1    Sep. 13, 2012

(30) Foreign Application Priority Data
Sep. 16, 2009 (NZ) ........................................ 576280

(51) Int. Cl.
*C10B 3/02* (2006.01)
*C07C 4/04* (2006.01)
*B01J 8/02* (2006.01)

(52) U.S. Cl. .......... 201/25; 202/105; 202/117; 202/138; 202/139

(58) Field of Classification Search .................... 201/25; 202/105, 117, 138, 139
See application file for complete search history.

(56) References Cited

U.S. PATENT DOCUMENTS

| | | | |
|---|---|---|---|
| 5,411,714 A | 5/1995 | Wu et al. | |
| 6,126,907 A * | 10/2000 | Wada | 422/184.1 |
| 7,329,329 B2 * | 2/2008 | Masemore et al. | 202/117 |
| 7,798,077 B2 * | 9/2010 | Gehring et al. | 110/229 |
| 2010/0276271 A1 * | 11/2010 | Dinnematin | 201/25 |

FOREIGN PATENT DOCUMENTS

JP        2001019974 A     1/2001

OTHER PUBLICATIONS

Notification of Transmittal of the International Search Report and the Written Opinion of the International Searching Authority, or the Declaration mailed Jan. 6, 2011.
Notification of Transmittal of International Preliminary Report on Patentability mailed Jan. 17, 2012.

* cited by examiner

*Primary Examiner* — Nina Bhat
(74) *Attorney, Agent, or Firm* — Holland & Hart LLP

(57) ABSTRACT

A pyrolysis apparatus and method for pyrolyzing plastic wastes to form a fuel and generating energy is described.

20 Claims, 1 Drawing Sheet

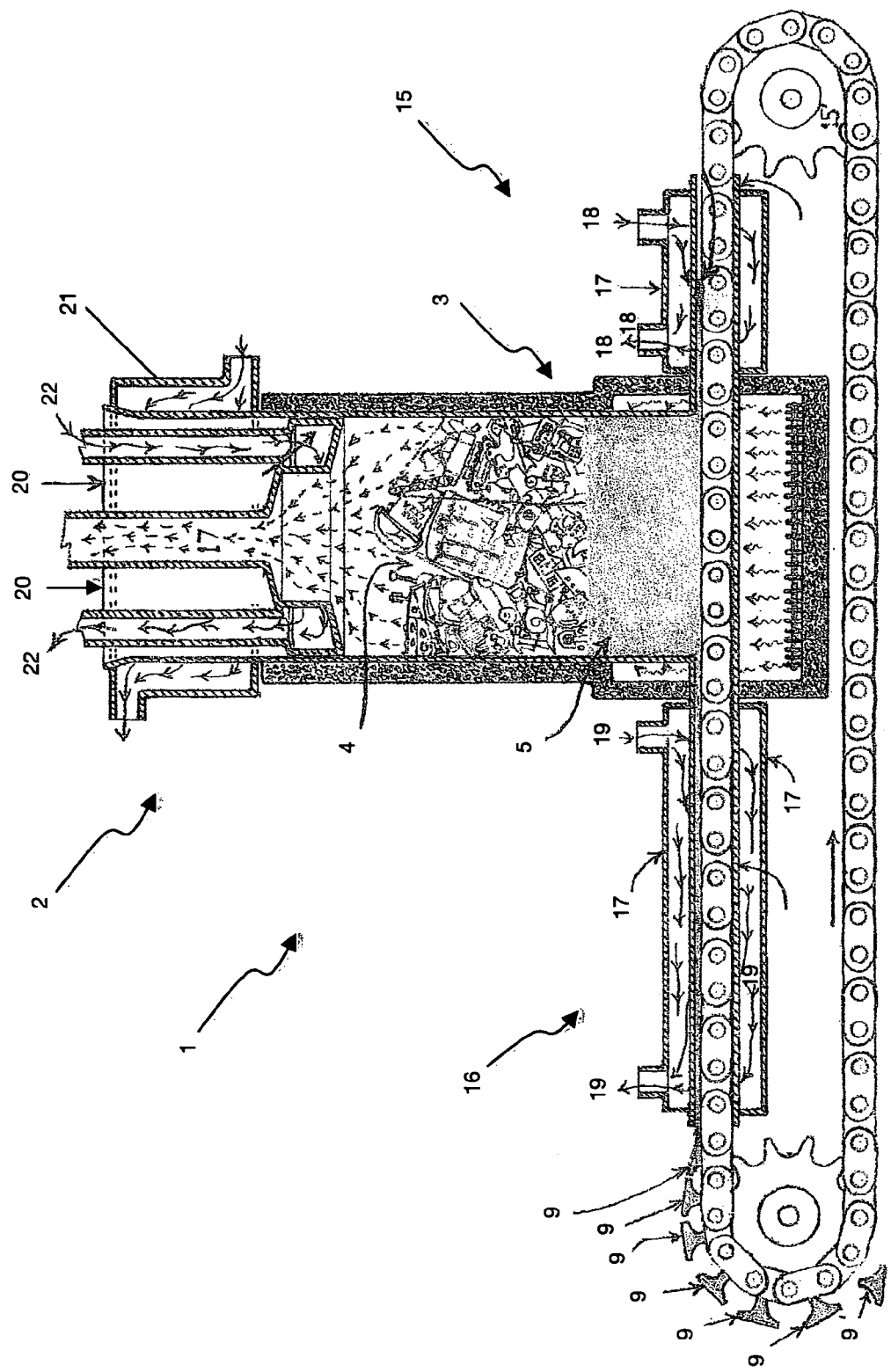

PYROLYSIS APPARATUS AND METHODS USING SAME

This application claims benefit under 371 of PCT/NZ10/00184 filed Sep. 14, 2010.

TECHNICAL FIELD

The application relates to pyrolysis apparatus and methods using same. More specifically, the application relates to an apparatus and methods using the apparatus to decompose plastic and produce fuel for further use in producing energy.

BACKGROUND ART

Considerable volumes of plastic waste are produced worldwide. Much of the waste plastic ends up in landfills and takes many years to degrade if they ever degrade. Waste plastic is problematic from an environmental point of view and the degradation of the landscape by landfills is undesirable.

Plastic materials are however made of essentially useful compounds that can be used to generate energy.

Processes are known in the art for processing plastic waste materials by thermochemical breakdown of plastic wastes by combustion, gasification or pyrolysis.

Pyrolysis is the preferred method of performing thermochemical break down of waste plastic materials. By varying conditions of a reactor, the composition of the products obtained may be adjusted to meet product needs. A disadvantage of pyrolysis is that the process is traditionally energy intensive owing to the endothermic nature of the physical and chemical processes involved. More specifically, significant energy is required to melt the polymer and to increase the temperature to facilitate the desired chemical reactions. In addition, catalysts may be essential to achieve the desired level of chemical cracking.

It is an object of the present application to address the foregoing problems or to at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the embodiments described herein will become apparent from the ensuing description that is given by way of example only.

SUMMARY

The application broadly relates to the use of plastic decomposition via pyrolysis to produce a fuel.

In some embodiments, there is provided a thermal conversion pyrolysis reactor apparatus including:

a. a pyrolysis reactor vessel with a heat source to heat plastic material in bottom of the vessel; and
b. a conveyer for transporting char and/or plastic from the vessel;
c. a condensing seal through which decomposed gas travels and wherein the condensing seal prevents entry of oxygen into the vessel and egress of heavier compounds out of the vessel.

In some embodiments, there is provided a method of completing thermal conversion pyrolysis of plastic by the steps of:

a. adding plastic to a reactor vessel substantially as described above;
b. heating the plastic sufficient to cause pyrolysis of the plastic;
c. collecting the resulting hydrocarbon gas from the reactor vessel.

In some embodiments, there is provided a method of producing electricity by the step of:

a. using the gas collected in the method substantially as described above to drive a generator to generate electricity.

Advantages of the apparatus and related methods are that the apparatus is simple to manufacture, cost effective to produce and use and produces a useful product from what is currently a waste product.

BRIEF DESCRIPTION OF THE DRAWINGS

Further aspects of the embodiments described herein will become apparent from the following description that is given by way of example only and with reference to the accompanying drawing in which:

FIG. 1 illustrates a diagram of one embodiment of a pyrolysis reactor apparatus.

DETAILED DESCRIPTION

The application broadly relates to the use plastic decomposition via pyrolysis to produce a fuel For the purposes of this specification, the term 'pyrolysis' refers to the process whereby carbonizable materials (in this case plastics) are converted to solid, gas and/or liquid residues without combustion or oxidisation.

The term 'thermal conversion' refers to use of heat to decompose carbonizable materials.

The term 'decompose' refers to breaking down or cracking the molecules in plastic into smaller constituent molecules.

The term 'cracking' refers to reducing the carbon chain length of hydrocarbon compounds.

The term 'condensing' and grammatical variations thereof refers to the conversion of a gaseous phase to either a liquid or solid phase.

In some embodiments, there is provided a thermal conversion pyrolysis reactor apparatus including:

a. a pyrolysis reactor vessel with a heat source to heat plastic material in bottom of the vessel;
b. a conveyer for transporting char and/or plastic from the vessel; and
c. a condensing seal through which decomposed gas travels and wherein the condensing seal prevents entry of oxygen into the vessel and egress of heavier compounds out of the vessel.

In some embodiments, the heat source may be electricity although other sources may be used without departing from the scope of the embodiments described herein.

In some embodiments, the conveyer maybe located at the bottom of the reactor vessel.

In some embodiments, the condensing seal may be located at the top of the reactor vessel.

Preferably, the conveyer inlet may be sealed by use of a cooling tube around a portion of the conveyer prior to entry of the conveyer into the reactor and wherein molten plastic and/or char in the reactor bottom enters the cooling tube and solidifies on or in the conveyer.

Preferably, the conveyer outlet may be sealed by use of a cooling tube around a portion of the conveyer as the conveyer exits the reactor and wherein molten plastic and/or char in the reactor bottom enters the cooling tube and solidifies on or in the conveyer.

Preferably, the cooling tube may abut the reactor vessel.

In some embodiments, the coolant used in the cooling tubes may be water although other coolants may be used without departing from the scope of the embodiments described herein.

In some embodiments, the conveyer may be a chain. A chain such as that made from connecting links and pins may be used. The chain may preferably be aligned so that the links are orientated in a vertical direction.

Preferably, the condensing seal may include a cooling jacket surrounding the outlet of the reactor through which decomposed gas is conveyed from the reactor.

The applicant has found that the condensing seal creates a layer of cool gas and gases of a higher density or molecular weight condense in the layer and return to the reactor essentially being refluxed back into the pyrolysis process.

Preferably, the coolant used in the condensing seal may be water although other coolants may be used without departing from the scope of the embodiments described herein.

In some embodiments, all steps may occur at once in the pyrolysis reactor. That is, raw material feed, decomposition, removal of char, and cooling occur in a single processing step.

In some alternative embodiments, the apparatus may be used in a two part process being:
a. formation of plastic pellets by melting the raw plastic in the reactor at a low enough temperature to minimise decomposition but sufficient to melt the plastic in the reactor and then transport and harden the molten plastic into discrete pellets via the conveyer; and
b. subsequent pyrolysis of the discrete pellets to decompose the pellets into gas and char.

In further alternative embodiments, the apparatus may be used in a two part process being:
a. partial pyrolysis of the plastic to decompose the plastic into gas and a plastic and char pellet mixture; and
b. subsequent complete pyrolysis of the plastic and char pellet mixture to decompose the pellets into gas and char.

In yet further alternative embodiments, the apparatus may be used in a three part process being:
a. formation of plastic pellets by melting the raw plastic in the reactor at a low enough temperature to minimise decomposition but sufficient to melt the plastic in the reactor and then transport and harden the molten plastic into discrete pellets via the conveyer;
b. subsequent partial pyrolysis of the discrete pellets to decompose the pellets into gas and a plastic and char pellet mixture; and
c. subsequent complete pyrolysis of the plastic and char pellet mixture to decompose the pellets into gas and char.

By way of illustration, the heat source may be sufficient to heat plastic material in the bottom of the apparatus to a temperature from 100-2000° C. In some embodiments, the temperature may be from 200-800° C. The exact temperature at which the reactor operates varies depending on the plastic raw material used and more specifically, the molecular weight of the plastic raw material. The temperature may also vary depending on the amount of wax material in the plastic.

In some embodiments, the pyrolysis reaction maybe manipulated so that the decomposition gas includes hydrocarbon chains with a length of less than 25 carbon atoms. In further embodiments, the decomposition gas may include hydrocarbon chains with a length of less than 15 carbon atoms.

In some embodiments, the apparatus may process plastic material as a batch process with plastic raw material being added to the reactor in one step. Alternatively, the apparatus may process plastic material as a semi-continuous process with plastic raw material being added in stages to the reactor. In a further alternative, the apparatus may process plastic material as a continuous process with plastic raw material being added to the reactor as a continuous feed.

In some embodiments, the reactor vessel may have a V-shaped bottom. The applicant has found that this shape is useful to ensure homogeneity in the molten plastic mixture at the base of the reactor and to ensure mixing and appropriate heat generation at the base of the plastic and potentially char mixture at the bottom of the reactor.

In preferred embodiments, the reactor vessel may have an aspect ratio of 2:1 to 10:1 height to width. This ratio is unexpectedly important as this ensures that the correct degree of reflux occurs in the reactor with the plastic decomposition products refluxing within the reactor sufficiently long to ensure cracking of the carbon chain compounds to less than 25 carbon atoms.

In some embodiments, the decomposition gas may be used to generate energy. The energy may be selected from electricity and/or heat. Producing electricity or heat may be completed in a cogeneration unit. Optionally, energy produced by the decomposed gas may be used to power the apparatus and for example heat the reactor vessel.

In further embodiments, the apparatus may be transportable. As may be appreciated, having a portable unit is useful as it may be transferred from site to site as and when required. The unit may be mounted on a wheeled trailer. Alternatively, the apparatus may be mounted on skids or on a rail bogey or similar transporting apparatus.

In some embodiments, the plastic raw material may be selected from thermoplastic wastes of polyolefinic and/or polyaromatic nature that do not have heteroatoms. Examples of these plastics include polyethylene.

In alternative embodiments, the plastic may include heteroatoms, and the apparatus includes an additional stage of low temperature pyrolysis to remove the heteroatoms prior to full decomposition.

Optionally a catalyst may be used within the reactor vessel to promote the pyrolysis reaction. The applicant has not found any particular need to use a catalyst however, to alter the reaction kinetics it may be beneficial to add a catalyst.

In other embodiments, there is provided a method of completing thermal conversion pyrolysis of plastic by the steps of:
a. adding plastic to a reactor vessel substantially as described above;
b. heating the plastic sufficient to cause pyrolysis of the plastic; and
c. collecting the resulting hydrocarbon gas from the reactor vessel.

In other embodiments, there is provided a method of producing electricity by the step of:
a. using the gas collected in the method as described above to drive a generator to generate electricity.

As noted above, advantages of the apparatus and related methods are that the apparatus is simple to manufacture, cost effective to produce and use and produces a useful product from a waste product.

WORKING EXAMPLES

Embodiments described above or now described with reference to examples illustrating embodiments of the apparatus and methods of using the apparatus.

Example 1

Referring to FIG. 1, a pyrolysis reactor apparatus 1 is illustrated. The reactor 1 is a cylindrical shaped hollow vessel with a top 2 and bottom 3. The vessel 1 may be insulated as shown by the darkened section in FIG. 1 around the vessel 1 walls. Raw plastic material 4 is fed into the top 2 of the reactor vessel 1. As illustrated in FIG. 1, the raw plastic material 4 may be of any shape or size and no special processing is required prior to adding to the vessel 1. The raw plastic 4 is heated and forms a melted portion 5 at the bottom 3 of the vessel 1. The molten plastic portion 5 decomposes into smaller carbon chains and the resulting gas 6 escapes through the top 2 of the vessel 1 and is collected for further use e.g. as a fuel. Char (not shown) being the solid by-product of the pyrolysis process accumulates at the bottom 3 of the vessel 1 with the molten plastic 5 and is removed from the vessel 1 by the conveyer 7.

The vessel 1 bottom 3 has a V-shaped cross-section (not shown) that the applicant has found to be useful to ensure the molten/decomposing plastic 5 at the bottom of the vessel 1 is fully homogenised and heated. The vessel bottom 3 also includes heat source 8, in the example shown being an electrical source. Other heat sources 8 may be used such as gas or other fuels. The heat source is capable of heating the plastic 4 to a temperature in the range of 100-2000° C., the specific temperature being dependent on the degree of decomposition desired and the plastic 4 type/molecular weight of the plastic 4. By way of example, in some embodiments, the vessel 1 may be used at a lower temperature purely to melt and pre-process the raw plastic 4 into pellets 9 ready for storage and/or further processing at a later stage. Alternatively, the reactor 1 may be used at higher temperatures to fully decompose into gas 6 and char, plastics 4 such as polyethylene and others, the exact temperature being dependent on the individual plastic 4 characteristics. In a further configuration, the process may have a partial decomposition step followed thereafter by a full decomposition step. In a yet further configuration the process may have a three step process involving a melt step followed by a partial to full decomposition step. Optionally, the melt step may be followed by a partial decomposition step and then a third full decomposition step.

As noted above, the reactor 1 bottom 3 also includes a conveyer 7. The conveyer 7 has been found to be an important part of the reactor apparatus 1. As illustrated in FIG. 1, the conveyer 7 can be a chain made up of links 10 and connecting pins 11, one of each noted in the FIGURE, the chain 7 being formed by a series of links 10 and pins 11 similar to a bicycle chain and the linkages have small cavities (not shown) defined therein. The chain 7 rotates in an anti-clockwise direction as shown by arrow 12 in the FIGURE (although the opposite may also be undertaken) and is driven by at least two sprockets 13 with teeth 14 that mate with the chain links 10. The chain 7 passes through the bottom 3 of the reactor vessel 1. The chain 7 ideally abuts the reactor base 15 to ensure the molten plastic/char 5 thoroughly engages with the cavities (not shown) in the chain 7.

As should be appreciated, maintaining an oxygen seal at the entrance 15 and exit 16 of the chain 7 to and from the vessel 1 bottom 3 is critical to ensure pyrolysis occurs within the vessel 1 and not combustion. The applicant has addressed this by using the plastic/char 5 mixture itself to form a seal at both the entry 15 and exit 16. This is achieved by enclosing the chain 7 at the entry 15 and exit 16 in tubes 17 and passing coolant through the tubes 17, the direction of travel of coolant shown by arrows 18 at the entry and 19 at the exit. Molten plastic/char 5 in the vessel 1 bottom 3 moves by gravity into the entry 15 and exit 16 tubes 17 and is cooled by the coolant 18. The molten plastic/char 5 solidifies on cooling effectively forming a seal once solidified and preventing egress of oxygen into the vessel 1. As should be appreciated, the length of the cooling tube sections may be varied to suit the speed of solidification of the molten plastic/char 5 in the tubes. Factors such as conveyer 7 speed, the plastic/char 5 temperature in the vessel 1 and the temperature of the coolant 18,19 will influence the speed at which solidification occurs. The example shown in FIG. 1 illustrates the fact that the exit 16 tube 17 is longer than the entry 15 tube 17, a factor in this design being the direction of travel of the chain 7.

Also, as shown in FIG. 1, the plastic/char 5 may be ejected as pellets 9 from the chain 7 links 10 via the teeth 14 in the sprockets 13. The resulting pellets 9 may be inserted back into the vessel 1 if they are predominantly plastic or may be waste if they are predominantly char. The degree of plastic or char left in the pellets 9 will depend on how fast decomposition has occurred and how long the reactor vessel 1 has been running. The faster the decomposition and the longer the reactor vessel 1 is run, the greater the char content of the pellets 9.

The top 2 section of the vessel 1 includes an exit flue for the decomposition gas 6. Depending on the type of plastic and pyrolysis reaction conditions, the gas 6 is made up of hydrocarbons with a carbon chain length of 25 carbon atoms or less. Ideally, the carbon chain length is less than 15 carbon atoms. This carbon chain length is preferable as it means that the resulting gas 6 performs well as a fuel for subsequent uses such as heat and/or electricity generation (not shown).

The top 2 of the vessel 1 may also include an inlet port or ports 20 through which feed plastic 4 may be added to the vessel 1. Pellets 9 from the conveyer 7 may also be recycled into the vessel 1 via the inlet port or ports 20.

The top 2 of the vessel 1 also includes a cooling system such as cooling jacket 21 through which coolant 22 such as water passes. The aim of the coolant system is to force longer carbon chain compounds such as waxes and partially decomposed plastic compounds to condense around the top 2 of the vessel 1 and subsequently drop back into the molten 5 section of the vessel 1. This forces these larger molecules to react and decompose further until the carbon chain length is sufficiently low so as to not condense and escape the vessel 1 as decomposed gas 6 with a carbon chain length below that desired i.e. less than 25 or 15 carbon atoms. In effect, the cooling system acts as a seal and forces the decomposing materials to reflux in the vessel 1 until sufficient reaction has occurred. Use of a cooling system avoids the need for a physical oxygen seal at the top of the vessel 1 as the condensing that occurs ensures that oxygen cannot enter the vessel 1. Also of use in ensuring the full pyrolysis occurs is that the layer of raw plastic 4 on top of the decomposing molten layer of plastic/char 5 provides a further barrier to oxygen interfering with the pyrolysis occurring.

The reactor vessel 1 ideally has an aspect ratio from 2:1 to 10:1 height to width. The applicant has found that this ratio of height to width is important to achieving the desired reflux of decomposing and condensing gases within the vessel. As should be appreciated, having sufficient reflux ensures that the pyrolysis reaction goes to completion or near completion whereas, without reflux, the degree of reaction may be less and the resulting decomposed gas 6 not as useful as a fuel.

Optionally, the apparatus 1 may be transportable i.e. it may be mounted onto a trailer with wheels or on a truck bed or on a railway bogey and moved between locations as required. While this embodiment is not shown, transport may be useful for smaller scale processing such us for movement between smaller towns and cities where less frequent plastic processing may be required.

As noted above, the apparatus may be used in a single step to decompose the plastic into gas and char or may be used in two steps, the first step being a pelletising step and the second being the decompose the plastic. Two steps may be useful where the plastic material may need to be made denser for subsequent processing. Two steps may also allow for a storage stage intermediate pelletising and decomposition.

As should further be appreciated, the apparatus 1 may be used to decompose plastic in batches with the vessel 1 being filled with the plastic to be processed, the inlet closed and processing occurring. Alternatively, the process may be semi-continuous with the raw plastic being fed to the vessel in steps. Further, the process may be continuous with the inlet receiving a steady stream of plastic raw material for example via an-auger or conveyer system (not shown).

The resulting decomposed gas makes a useful fuel for various energy generation processes such as for electricity generation, heat generation or a combination of these via a cogeneration system.

Advantages of the apparatus and related methods include use of a simple apparatus that uses a waste product. The apparatus further extracts energy from what would otherwise be a problem material environmentally. The apparatus also minimises running costs as it use minimal energy to decompose the plastic and even the energy used may be generated from previous decomposed gas.

Aspects of the embodiments described herein have been described by way of example only and it should be appreciated that modifications and additions may be made thereto without departing from the scope of the claims herein.

What is claimed is:

1. A thermal conversion pyrolysis reactor apparatus including:
   a. a pyrolysis reactor vessel with a heat source to heat plastic material in a first bottom part of the vessel;
   b. a chain conveyer for transporting char and/or plastic to and from the vessel bottom part via at least one chain conveyor inlet and at least one chain conveyer outlet; and
   c. a condensing seal located inside and approximate a second top part of the reactor vessel through which decomposed gas travels and wherein the condensing seal prevents entry of oxygen into the vessel and egress of heavier compounds out of the vessel.

2. The apparatus as claimed in claim 1 wherein the heat source is electricity.

3. The apparatus as claimed in claim 1 wherein the chain conveyer inlet is sealed by use of at least one cooling tube around a portion of the chain conveyer prior to entry of the chain conveyer into the reactor and wherein molten plastic and/or char in the reactor bottom enters the cooling tube or tubes and solidifies on or cools in the chain conveyer.

4. The apparatus as claimed in claim 1 wherein the chain conveyer outlet is sealed by use of at least one cooling tube around a portion of the chain conveyer as the chain conveyer exits the reactor and wherein molten plastic and/or char in the reactor bottom enters the cooling tube or tubes and solidifies or cools on or in the chain conveyer.

5. The apparatus as claimed in claim 3 wherein the cooling tube or tubes abut the reactor vessel.

6. The apparatus as claimed in claim 3 wherein water is used as a coolant in the cooling tube or tubes.

7. The apparatus as claimed in claim 1 wherein the condensing seal includes an outlet from the reactor surrounded by a cooling jacket through which decomposed gas leaves the reactor.

8. The apparatus as claimed in claim 1 wherein the condensing seal creates a layer of cool gas and gases of a higher density or molecular weight condense in the layer and return to the reactor.

9. The apparatus as claimed in claim 1 wherein water is used as a coolant in the condensing seal.

10. The apparatus as claimed in claim 2 wherein the heat source is sufficient to heat plastic material in the bottom of the apparatus to a temperature from 100° C. to 800° C.

11. The apparatus as claimed in claim 1 wherein the decomposition gas includes hydrocarbon chains with a length of less than 25 carbon atoms.

12. The apparatus as claimed in claim 1 wherein the decomposition gas includes hydrocarbon chains with a length of less than 15 carbon atoms.

13. The apparatus as claimed in claim 1 wherein the apparatus processes plastic material as a batch process with plastic raw material being added to the reactor in one step.

14. The apparatus as claimed in claim 1 wherein the apparatus processes plastic material as a semi-continuous process with plastic raw material being added in stages to the reactor.

15. The apparatus as claimed in any claim 1 wherein the apparatus processes plastic material as a continuous process with plastic raw material being added to the reactor as a continuous feed.

16. The apparatus as claimed in claim 1 wherein the pyrolysis reactor vessel has an aspect ratio of 2:1 to 10:1 height to width.

17. The apparatus as claimed in claim 1 wherein the plastic material is selected from thermoplastic wastes of polyolefinic and/or polyaromatic nature that does not have heteroatoms.

18. The apparatus as claimed in claim 1 wherein the plastic material includes heteroatoms and the apparatus includes an additional stage of low temperature pyrolysis to remove the heteroatoms prior to full decomposition.

19. A method of completing thermal conversion pyrolysis of plastic by the steps of:
   a. adding plastic to a thermal conversion pyrolysis reactor apparatus including
      i. a pyrolysis reactor vessel with a heat source to heat plastic material in a first bottom part of the vessel;
      ii. a chain conveyer for transporting char and/or plastic to and from the vessel bottom part via at least one chain conveyor inlet and at least one chain conveyor outlet; and
      iii. a condensing seal located inside and approximate a second top part of the reactor vessel through which decomposed gas travels and wherein the condensing seal prevents entry of oxygen into the vessel and egress of heavier compounds out of the vessel.
   b. heating the plastic sufficient to cause pyrolysis of the plastic;
   c. collecting the resulting hydrocarbon gas from the reactor vessel.

20. The method as claimed in claim 18 wherein heating in step b) occurs in two stages being:
   (b)(i) the plastic is heated sufficient to cause partial pyrolysis and solids from partial heating step are collected and removed from the reactor vessel; and
   (b)(ii) partially pyrolysed solids from step (b)(i) are then heated again to fully pyrolyse the plastic.

* * * * *